(12) United States Patent
McColloch

(10) Patent No.: US 8,801,297 B2
(45) Date of Patent: Aug. 12, 2014

(54) METHODS AND SYSTEMS FOR BLIND MATING MULTI-OPTICAL FIBER CONNECTOR MODULES

(75) Inventor: Laurence R. McColloch, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 159 days.

(21) Appl. No.: 13/593,857

(22) Filed: Aug. 24, 2012

(65) Prior Publication Data
US 2014/0056560 A1 Feb. 27, 2014

(51) Int. Cl.
*G02B 6/38* (2006.01)
*G02B 6/42* (2006.01)

(52) U.S. Cl.
CPC ............ *G02B 6/4292* (2013.01); *G02B 6/4204* (2013.01); *G02B 6/4214* (2013.01); *G02B 6/4246* (2013.01); *G02B 6/423* (2013.01)
USPC .................................. 385/59; 385/65; 385/71

(58) Field of Classification Search
CPC .. G02B 6/4292; G02B 6/4204; G02B 6/4214; G02B 6/4246; G02B 6/423; G02B 6/3839; G02B 6/3636; G02B 6/4228
USPC ................................................ 385/59, 65, 71
See application file for complete search history.

(56) References Cited

U.S. PATENT DOCUMENTS

| | | |
|---|---|---|
| 5,892,870 A | 4/1999 | Fingler et al. |
| 5,907,651 A | 5/1999 | Bunin et al. |
| 6,085,003 A | 7/2000 | Knight |
| 6,594,436 B2 | 7/2003 | Sun et al. |
| 6,860,645 B2 | 3/2005 | Miller et al. |
| 6,918,703 B2 | 7/2005 | Chen et al. |
| 6,931,195 B2 | 8/2005 | Lemoff |
| 7,003,869 B2 | 2/2006 | Lutzen et al. |
| 7,090,412 B2 * | 8/2006 | Kato et al. ...................... 385/93 |
| 7,197,224 B2 | 3/2007 | Rolston et al. |
| 7,220,065 B2 | 5/2007 | Han et al. |
| 7,280,733 B2 | 10/2007 | Larson et al. |
| 7,543,994 B2 | 6/2009 | McColloch |

(Continued)

FOREIGN PATENT DOCUMENTS

| | | |
|---|---|---|
| CN | 201796164 U | 4/2011 |
| JP | 2006010871 A | 1/2006 |

OTHER PUBLICATIONS

MTP Solutions for High Density Networks, 2010, p. 1-22, FireFab, United Kingdom.
MTP Backplane Interconnect System (BMTP), p. 1, Molex.

*Primary Examiner* — Charlie Peng
*Assistant Examiner* — Mary El Shammaa

(57) ABSTRACT

Systems and methods are provided that enable a first bank, or array, of multi-optical fiber connector modules disposed in a plug that is mounted on a first structure to be simultaneously blind mated with a second bank of multi-optical fiber connector modules disposed on a receptacle that is mounted on a second structure. As the first and second structures are brought into engagement with one another, passive coarse alignment features on the plug and on the receptacle coarsely align the respective connector modules with one another. Then, as the respective connector modules begin to come into contact with one another, passive fine alignment features on the respective connector modules engage one another to finely align the respective connector modules such that their optical pathways are brought into precise optical alignment with one another.

26 Claims, 16 Drawing Sheets

(56) References Cited

U.S. PATENT DOCUMENTS

| | | |
|---|---|---|
| 7,553,091 B2 | 6/2009 | McColloch |
| 7,794,156 B2 | 9/2010 | Wang et al. |
| 7,905,751 B1 | 3/2011 | Davis |
| 8,002,477 B2 | 8/2011 | Colgan et al. |
| 8,036,500 B2 | 10/2011 | McColloch |
| 2008/0095502 A1 | 4/2008 | McColloch |
| 2010/0220953 A1 | 9/2010 | Kewitsch et al. |
| 2011/0123144 A1* | 5/2011 | Wang et al. ............ 385/14 |

* cited by examiner

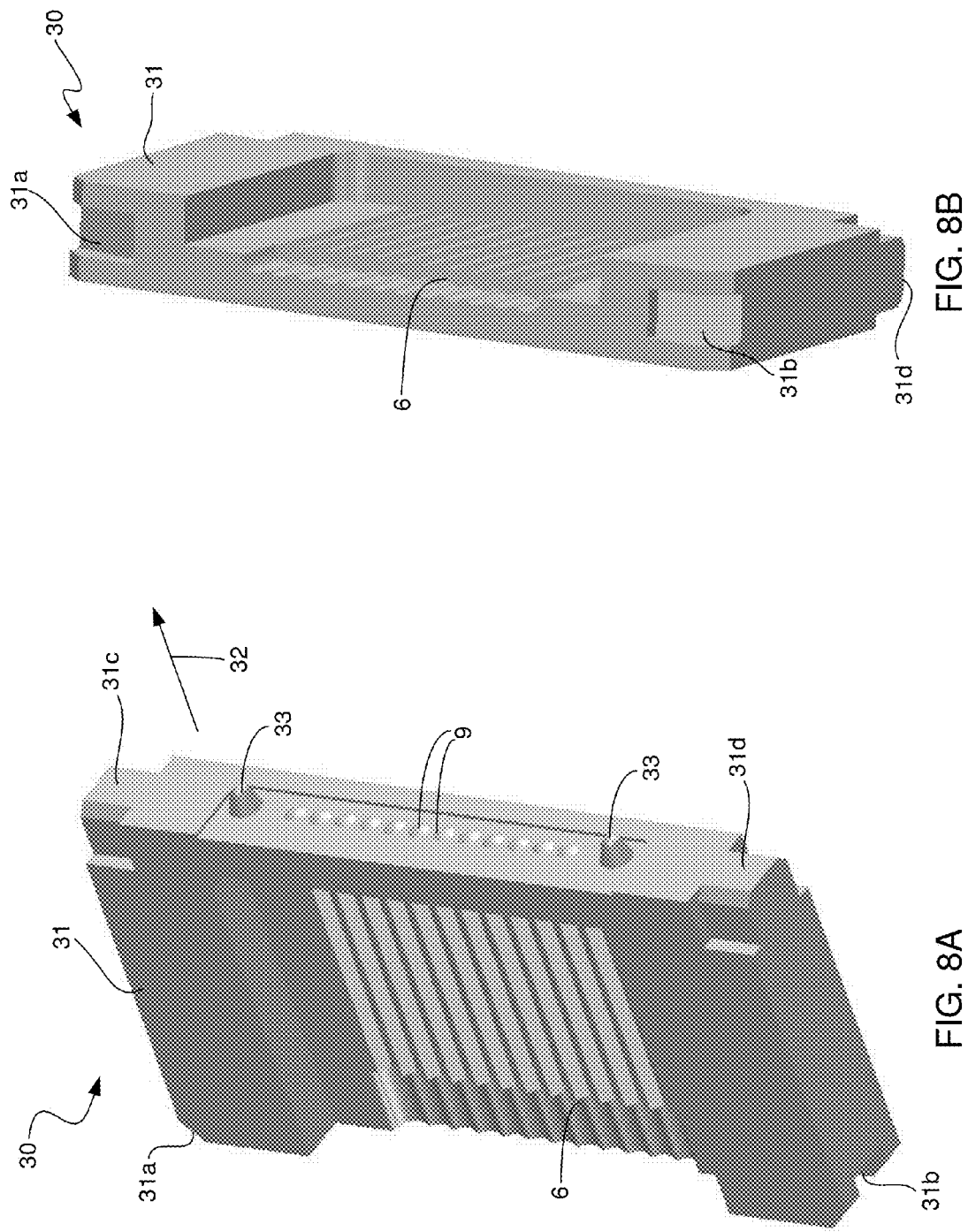

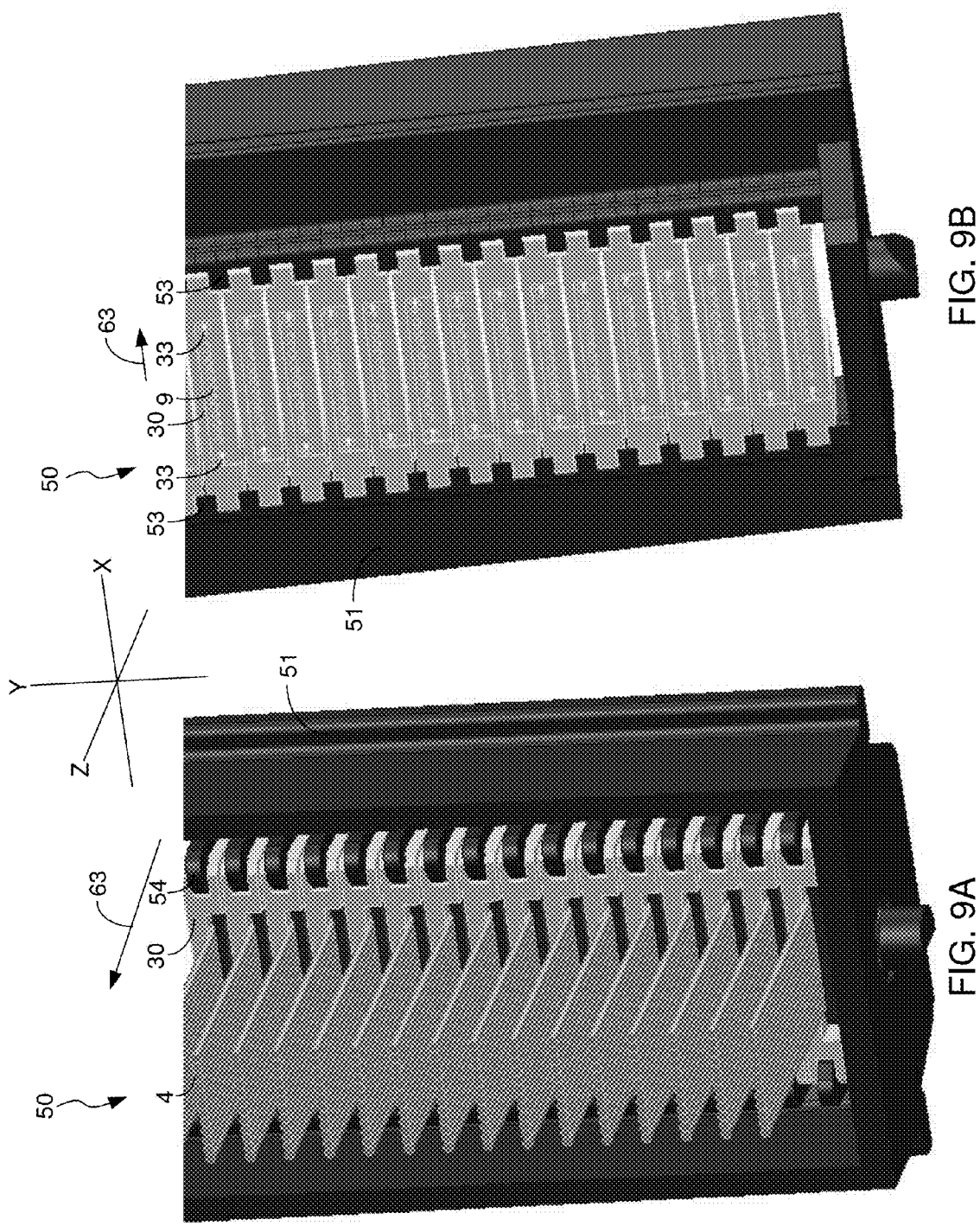

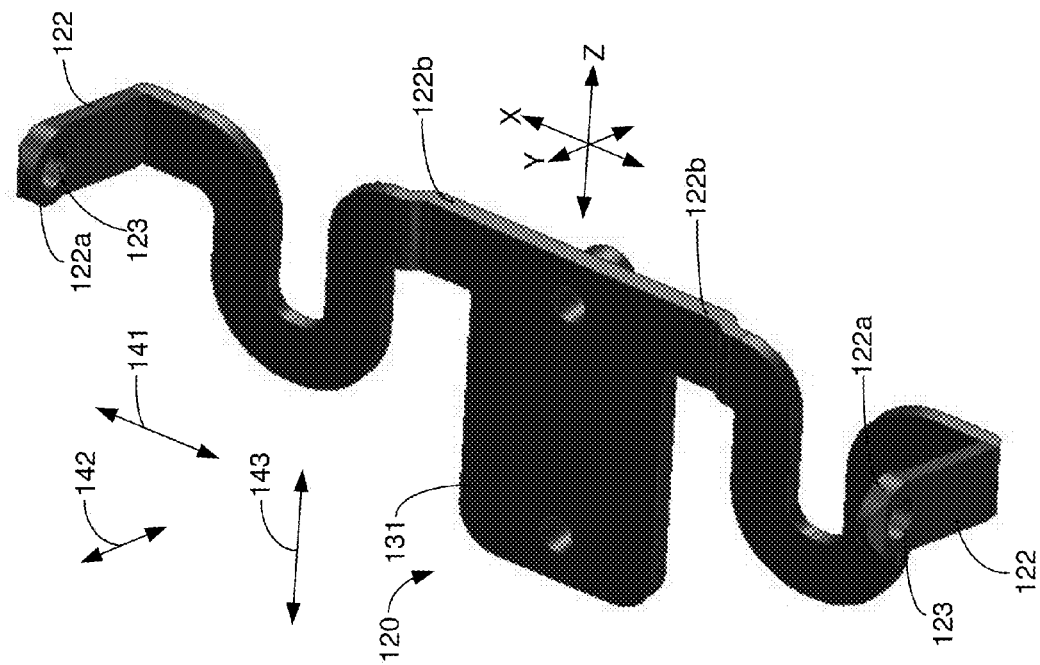
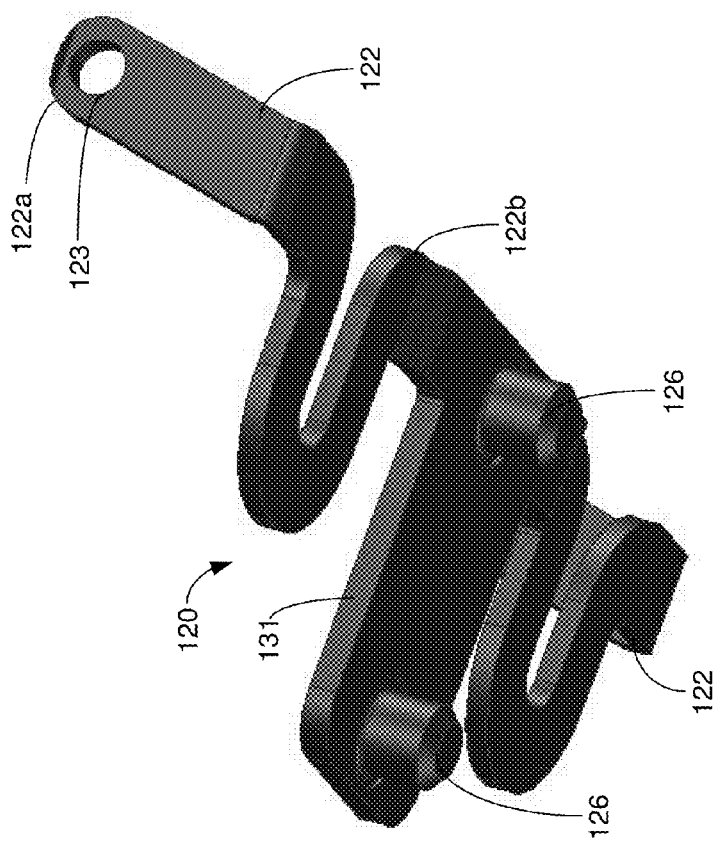
FIG. 16B
FIG. 16A

_METHODS AND SYSTEMS FOR BLIND MATING MULTI-OPTICAL FIBER CONNECTOR MODULES_

TECHNICAL FIELD OF THE INVENTION

The invention relates to optical communications. More particularly, the invention relates to methods and systems for blind mating multi-optical fiber connector modules.

BACKGROUND OF THE INVENTION

Multi-optical fiber connector modules are used to mechanically couple the ends of a plurality of optical fibers to a parallel optical communications module that has a plurality of optical channels. The parallel optical communications module may be a parallel optical transceiver module having both transmit and receive optical channels, a parallel optical transmitter module having only transmit optical channels, or a parallel optical receiver module having only receive optical channels. A typical multi-optical fiber connector module includes an optics system that couples light between the ends of the optical fibers and respective optoelectronic devices that are contained within the parallel optical communications module. For transmit optical channels, the optoelectronic devices are electrical-to-optical converters such as laser diodes or light-emitting diodes (LEDs). For receive optical channels, the optoelectronic devices are optical-to-electrical converters such as photodiodes.

The multi-optical fiber connector modules and the parallel optical communications modules typically have mating features on them that allow the multi-optical fiber connector modules to be fixedly or removably mechanically coupled to one another. A variety of multi-optical fiber connector modules and parallel optical communications modules exist in the market today that are designed to mate with one another in a way that optically aligns the optical pathways between the ends of the optical fibers and the ends of the respective optoelectronic devices to enable optical data signals to be coupled between ends of the optical fibers and the respective optoelectronic devices. In designing and manufacturing the multi-optical fiber connector modules and the corresponding parallel optical communications modules, great care is taken to ensure that once the modules are mated together very precise optical alignment exists along the optical pathways.

A variety of passive and active optical alignment techniques and tools are used today to provide the precise optical alignment that is needed to prevent unacceptable optical losses from occurring. Unacceptable optical losses lead to signal degradation, which can lead to an unacceptable bit error rate (BER). When the multi-optical fiber connector modules and the corresponding parallel optical communications modules are manufactured, the manufacturing tolerances typically must be extremely tight in order to ensure that very precise optical alignment exists along the optical pathways when the modules are mechanically coupled to one another in their ultimate relative positions and orientations. Otherwise, the optical alignment along the optical pathways will not have sufficient precision to prevent unacceptable optical losses from occurring. However, manufacturing the modules with very tight mechanical tolerances increases manufacturing costs, which increases the overall costs of the modules. In addition, the requirement of having to achieve very tight mechanical tolerances can lead to a decrease in yield for the modules, which also increases the overall costs of the modules.

Many connector modules are designed and manufactured to include passive alignment features, such as key/keyway mating features, which guide the modules into optical alignment with another mating module or receptacle as they are mechanically coupled together. For example, the opening in a receptacle guides a mating connector module into course alignment with the receptacle and then passive alignment features in the receptacle and on the connector module then mate to bring the optical pathways of the connector module into fine, or precise, optical alignment with the optical pathways of the receptacle. While such passive alignment features generally work well for their intended purposes, they are not suitable for simultaneous blind mating of multiple connector modules with multiple respective mating modules or receptacles.

For example, for a server box that has multiple multi-fiber connector modules disposed on it that must be mated with corresponding multi-fiber connector modules disposed on a printed circuit board (PCB) of a backplane, the connector modules disposed on the server box are required to be individually manually interconnected with the respective connector modules disposed on the backplane using optical cables. As examples, in the case of LC optical connectors, an LC-to-LC optical cable is used to make the interconnection whereas in the case of MTP® optical connectors, an MTP-to-MTP optical cable is used to make the interconnection. Making these interconnections can be a difficult and time-consuming task.

A need exists for methods, apparatuses and systems that enable a bank of multi-optical fiber connector modules disposed on one structure to be simultaneously blind mated with another bank of connector modules disposed on another structure, thereby obviating the need to individually manually interconnect the connector modules.

SUMMARY OF THE INVENTION

The invention is directed to systems and methods for blind mating multi-optical fiber connector modules. The system comprises a first structure having a plug mounted thereon, a second structure having a receptacle mounted thereon, a plurality of first multi-optical fiber connector modules held in slots formed in a housing of the plug, and a plurality of second multi-optical fiber connector modules held in slots formed in the receptacle. The plug housing has first passive coarse alignment features thereon. The receptacle has second passive coarse alignment features thereon. Each of the first multi-optical fiber connector modules has first fine passive alignment features thereon. Each of the first multi-optical fiber connector modules is configured to mechanically and optically couple to ends of a plurality of first optical fibers. Each of the second multi-optical fiber connector modules has second fine passive alignment features thereon. Each of the second multi-optical fiber connector modules is configured to mechanically and optically couple to ends of a plurality of second optical fibers.

The first and second structures are mechanically engaged with one another such that the first passive coarse alignment features of the plug are engaged with the second passive coarse alignment features of the receptacle. Engagement of the first and second passive coarse alignment features with one another causes the first passive fine alignment features of the first multi-optical fiber connector modules to engage the second passive fine alignment features of the second multi-optical fiber connector modules such that each of the first multi-optical fiber connector modules is engaged with, and optically aligned with, a respective second multi-optical fiber connector module.

The method comprises:

providing a first structure having a plug mounted thereon, wherein the plug includes a plug housing having first passive coarse alignment features thereon and slots in which a plurality of first multi-optical fiber connector modules are held;

providing a second structure having a receptacle mounted thereon, wherein the receptacle has second passive coarse alignment features thereon and slots in which a plurality of second multi-optical fiber connector modules are held; and mechanically engaging the first and second structures with one another such that the first passive coarse alignment features are engaged with the second passive coarse alignment features, wherein the engagement of the first passive coarse alignment features with the second passive coarse alignment features causes the first and second passive fine alignment features of the first and second multi-optical fiber connector modules to engage one another such that each of the first multi-optical fiber connector modules is engaged with, and optically aligned with, a respective second multi-optical fiber connector module.

These and other features and advantages of the invention will become apparent from the following description, drawings and claims.

BRIEF DESCRIPTION OF THE DRAWINGS

FIGS. 8A and 8B illustrate front and back perspective views, respectively, of a multi-optical fiber connector module in accordance with another illustrative embodiment.

FIGS. 9A and 9B illustrate back and front perspective views, respectively, of a plug that holds a bank, or array, of the connector modules shown in FIGS. 8A and 8B.

FIGS. 16A and 16B illustrate bottom and top perspective views, respectively, of the plug base shown in FIG. 15.

DETAILED DESCRIPTION OF AN ILLUSTRATIVE EMBODIMENT

Figure 1:
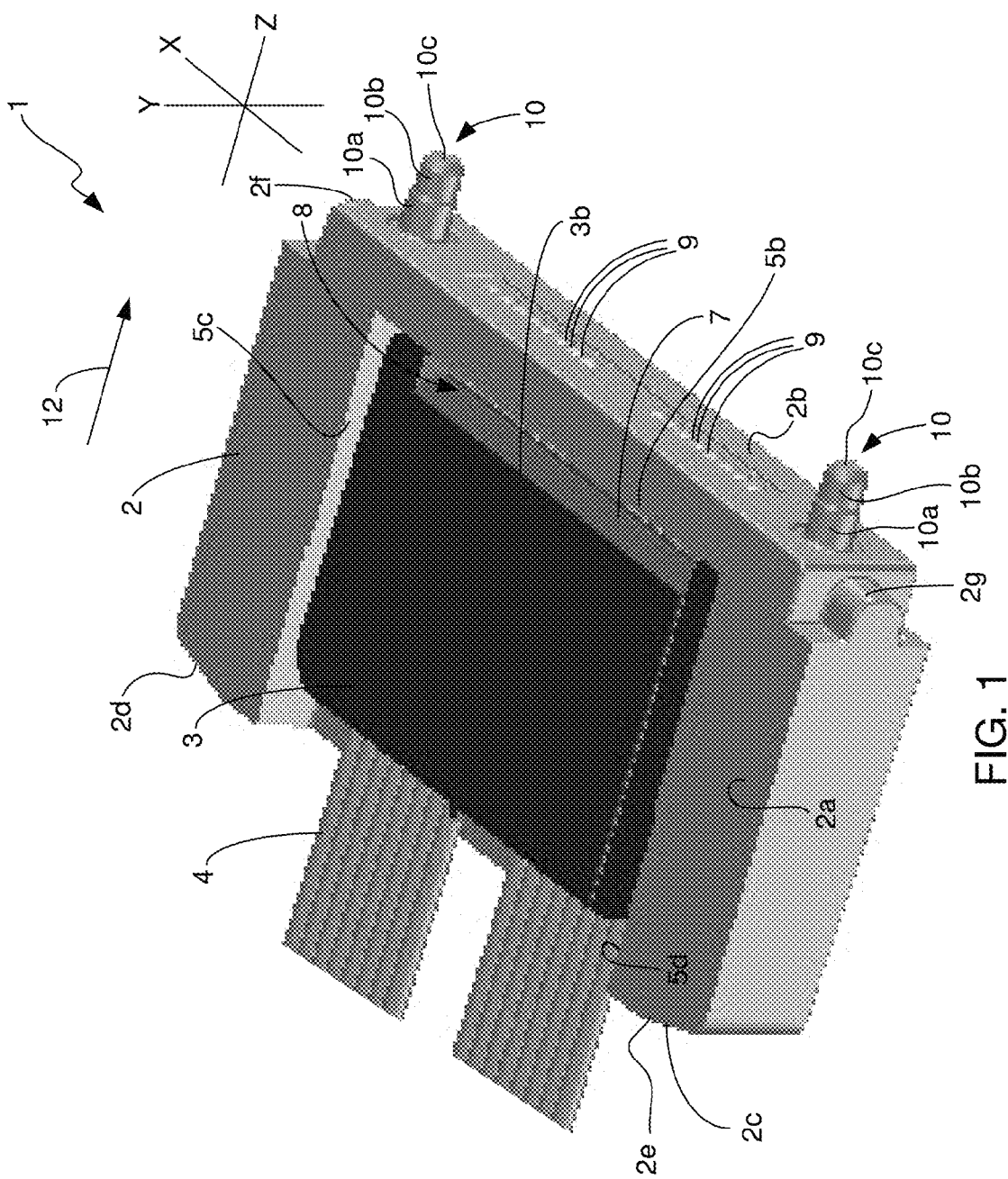
FIG. 1 illustrates a side perspective view of a multi-optical fiber connector module in accordance with an illustrative embodiment.

In accordance with embodiments of the invention, systems and methods are provided that enable a first bank, or array, of multi-optical fiber connector modules disposed in a plug that is mounted on a first structure to be simultaneously blind mated with a second bank of multi-optical fiber connector modules disposed on a receptacle that is mounted on a second structure, thereby obviating the need to individually interconnect the modules with optical cables. The first structure may be, for example, a rack having at least one slot configured to receive a server box, in which case the second structure is the server box itself. As the first and second structures are brought into engagement with one another, passive coarse alignment features on the structures engage one another and passive coarse alignment features on the plug and on the receptacle engage one another, which causes the respective connector modules to come into coarse alignment with one another. Then, as the respective connector modules begin to come into contact with one another, passive fine alignment features on the respective connector modules engage one another to finely align the respective connector modules such that their optical pathways are brought into precise optical alignment with one another.

In this way, the connector modules of the first and second banks are blind mated with one another through engagement of the first and second structures. This eliminates the need to use optical cables or the like to optical interconnect the respective connector modules. To facilitate the blind mating of the respective connector modules, it has been determined that the connector modules of one of the banks should be able to "float" to some extent while the connector modules of the other bank should be rigidly mounted to prevent them from floating. This floating aspect, which is described below in detail, helps ensure that the passive fine alignment features of the respective connector modules fully engage one another to effectuate fine optical alignment, i.e., precise optical alignment of the optical pathways of the respective connector modules.

Examples of multi-optical fiber connector modules that are suitable for use with the invention and that have features that enable them to float will be described with reference to FIGS. 1-8B. An illustrative embodiment of a plug and receptacle that hold respective banks of the connector modules and that are configured to be blind mated with one another will be described with reference to FIGS. 9A-13. An example of an application in which the plug and receptacle are mounted on first and second structures, respectively, will then be described with reference to FIGS. 14-16B. Like reference numbers in the figures represent like elements, features, or components. The features in the drawings are not necessarily drawn to scale.

Figure 2:
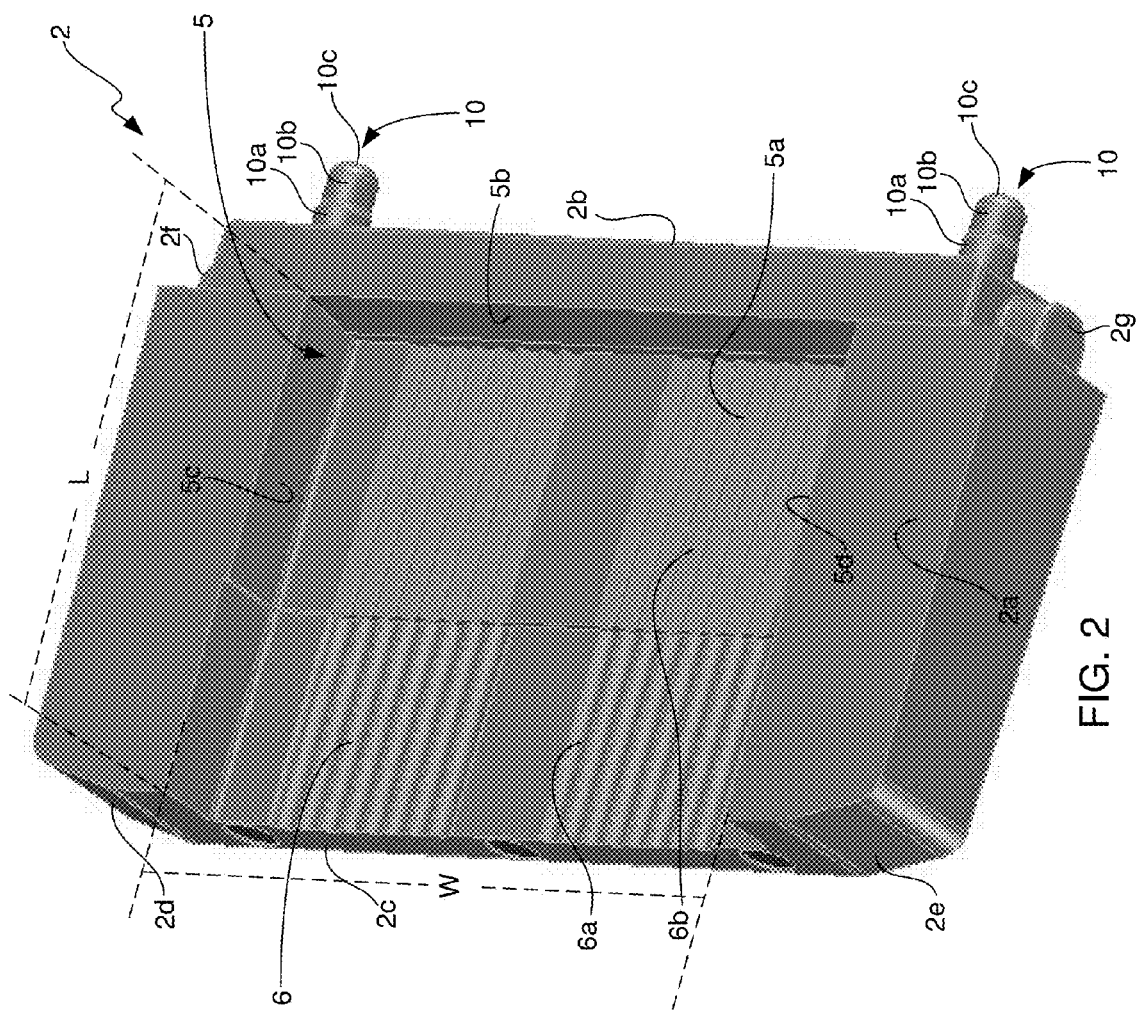
FIG. 2 illustrates a top perspective view of the module housing of the connector module shown in FIG. 1 with the cover and the optical fibers removed.
Figure 3:
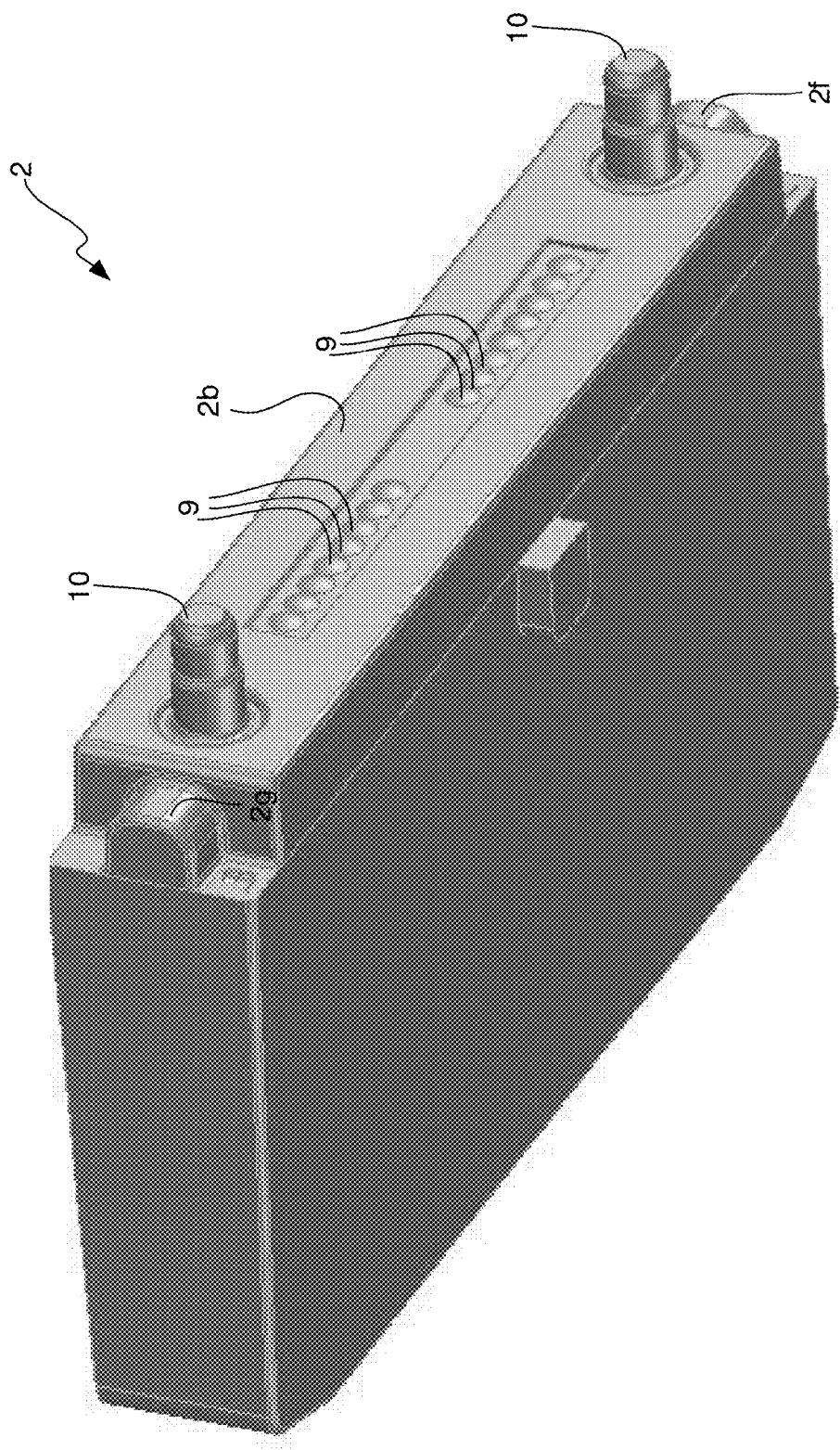
FIG. 3 illustrates a bottom perspective view of the module housing shown in FIG. 2.
Figure 4:
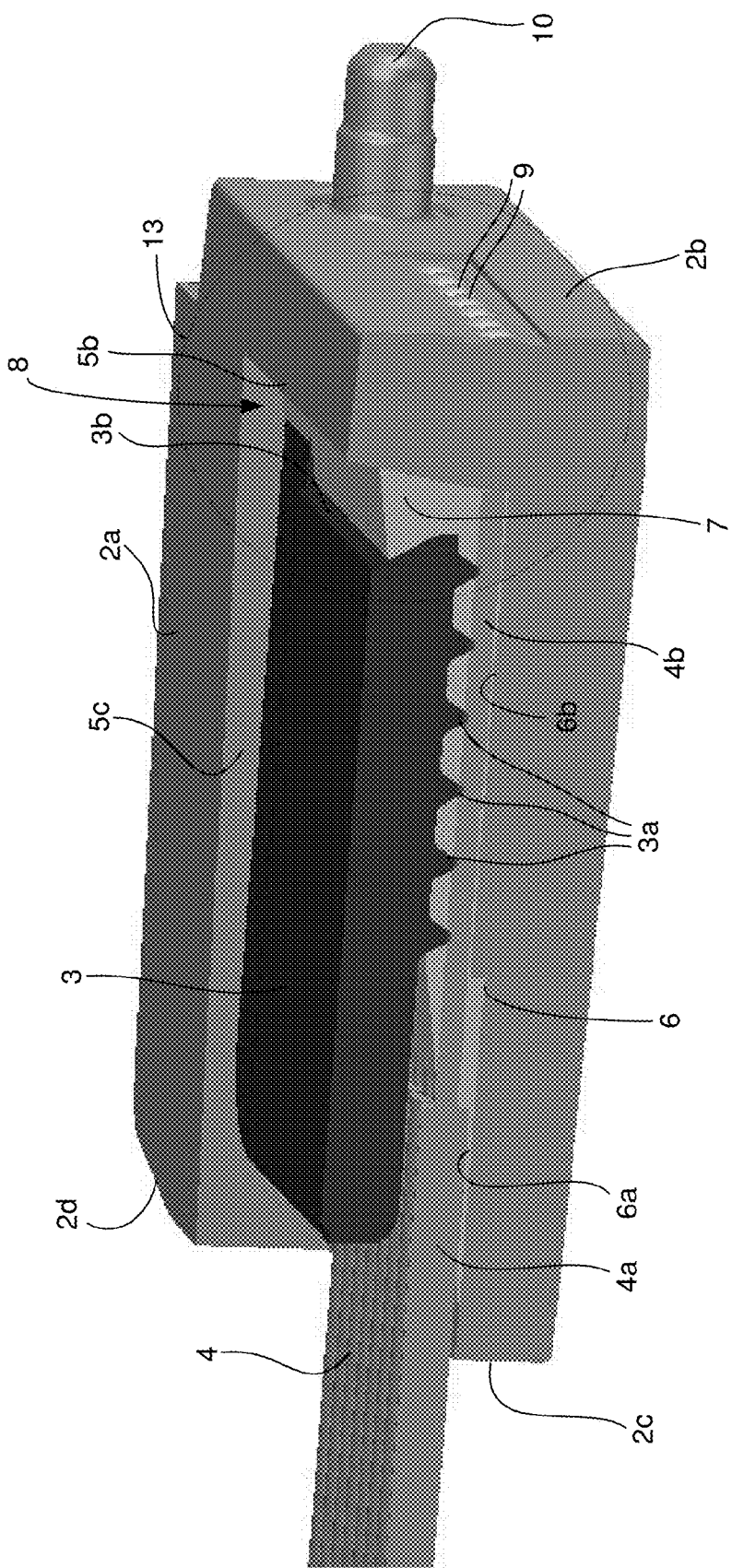
FIG. 4 illustrates a cross-sectional side perspective view of the multi-optical fiber connector module shown in FIG. 1.
Figure 5:
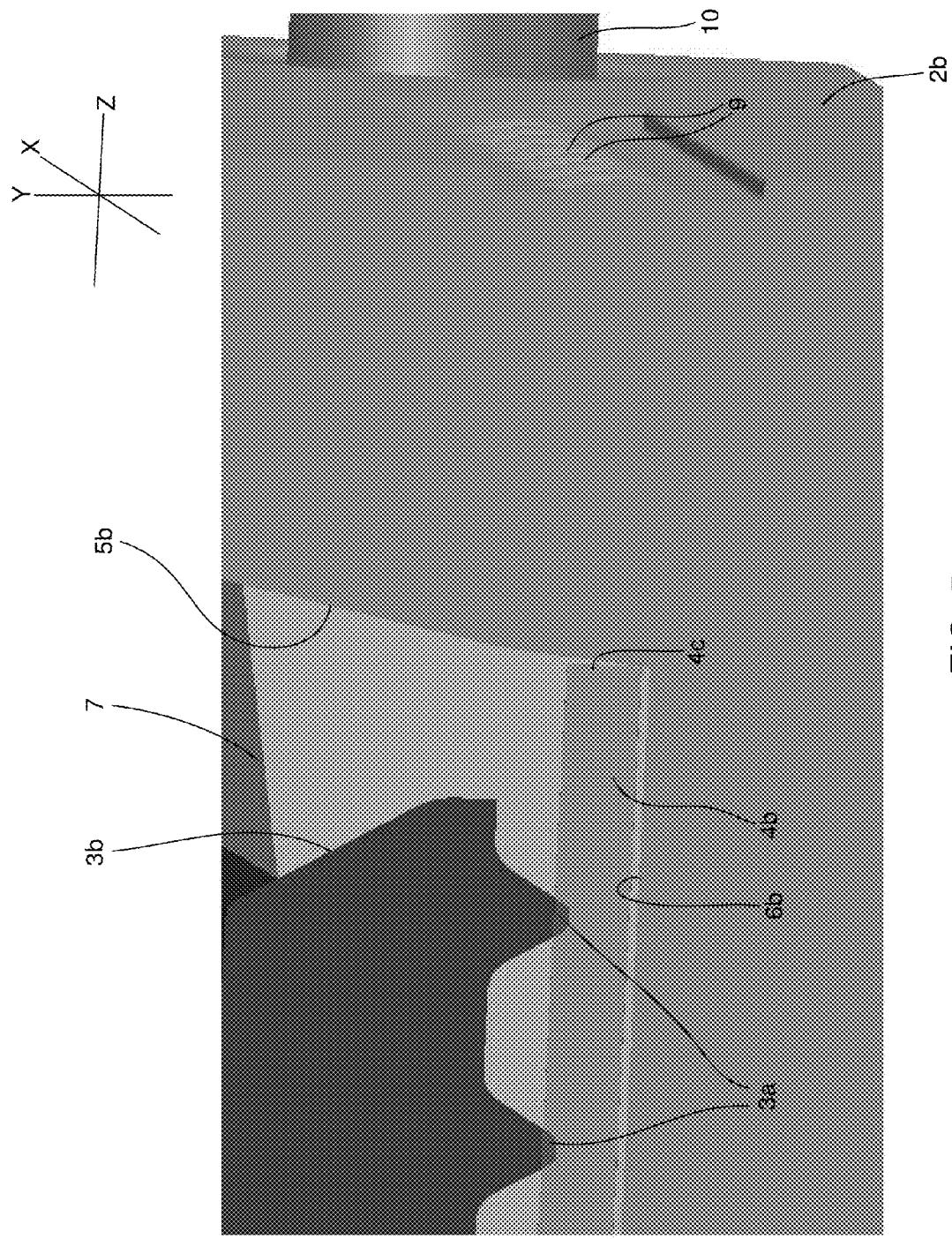
FIG. 5 illustrates an expanded view of the portion of the connector module that is within the dashed circle 13 shown in FIG. 4.
Figure 6:
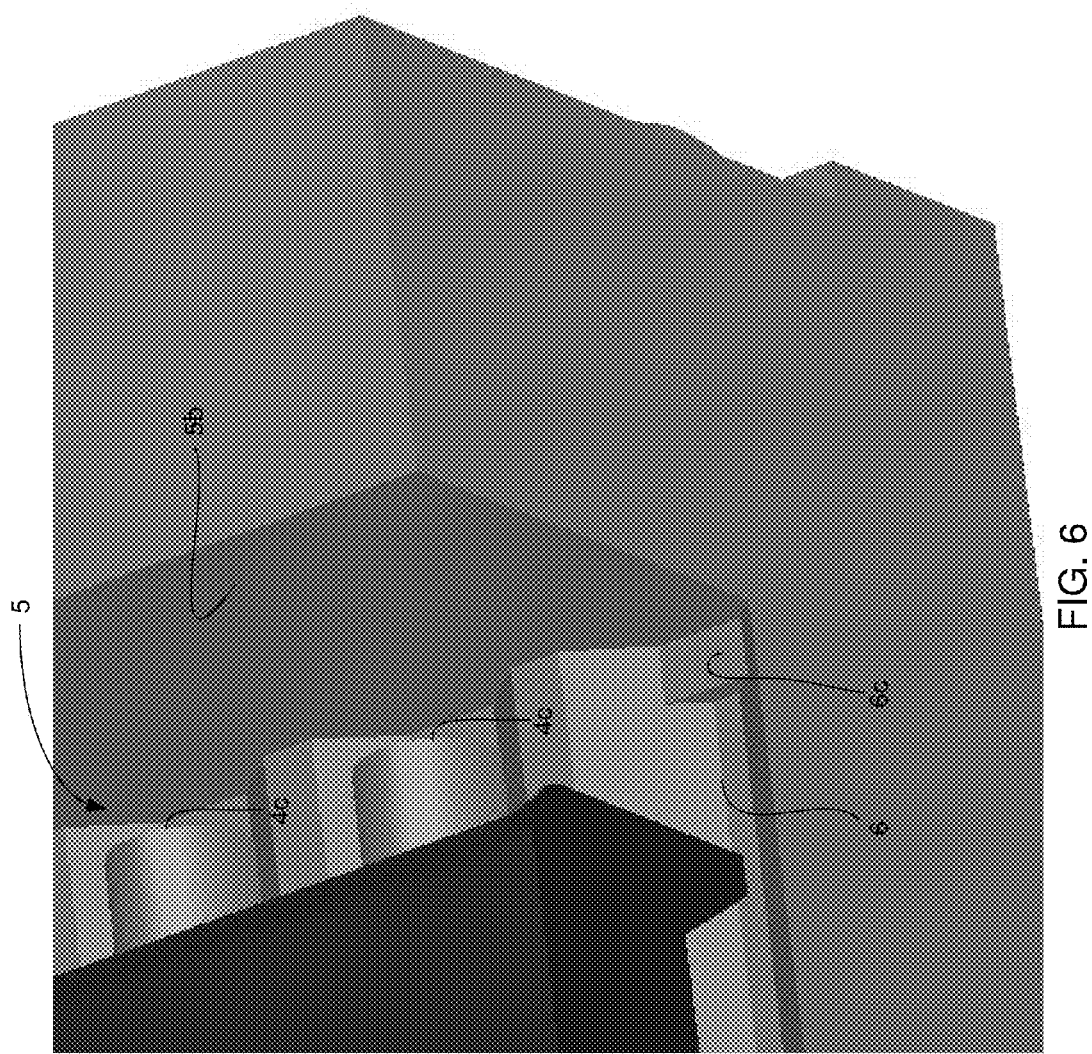
FIG. 6 illustrates an alternative embodiment of the module housing shown in FIG. 2.
Figure 7:
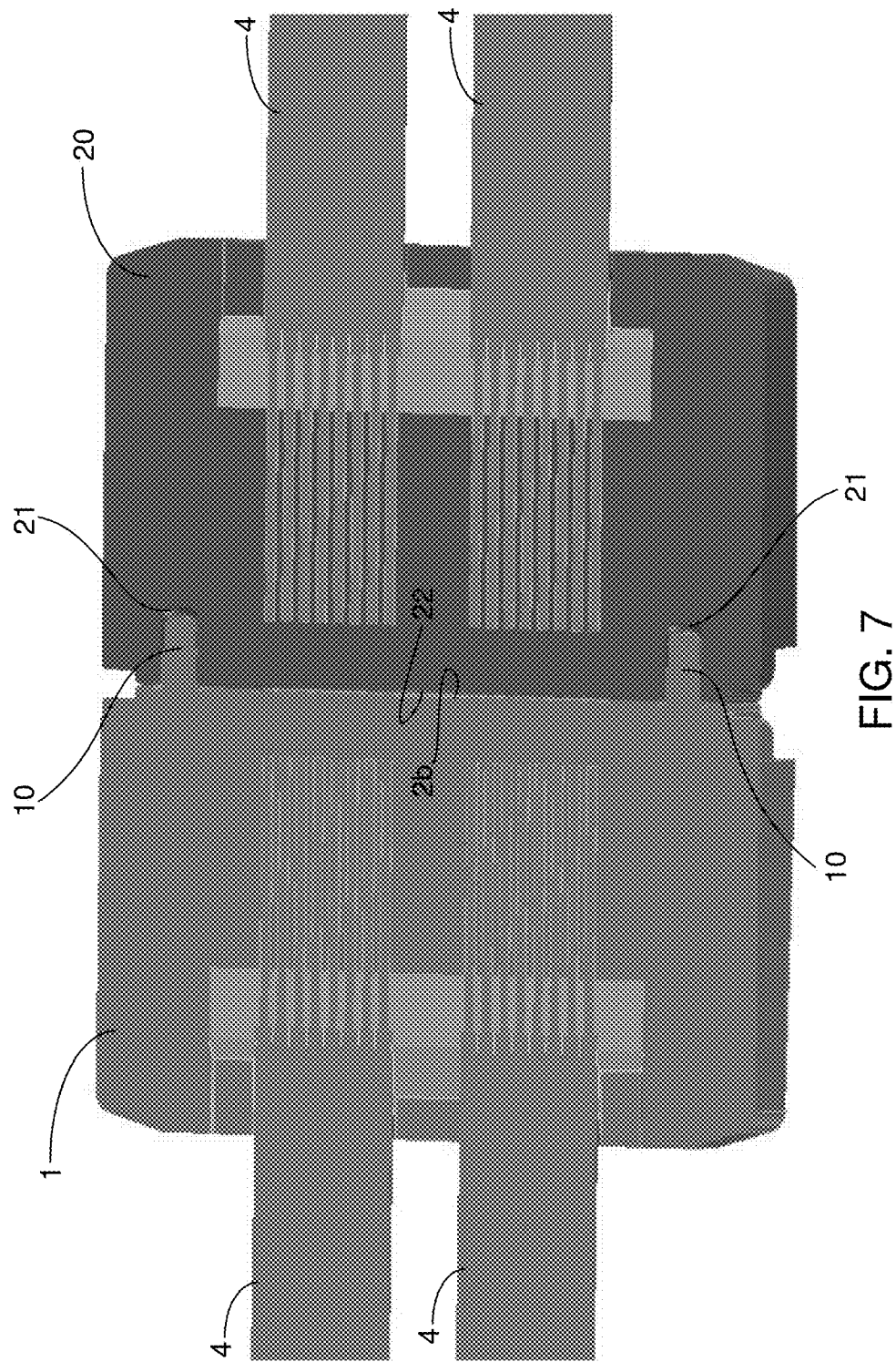
FIG. 7 illustrates a cross-sectional view of the multi-optical fiber connector module shown in FIG. 1 mated with a similarly-configured multi-optical fiber connector module.

FIG. 1 illustrates a side perspective view of the multi-optical fiber connector module 1 in accordance with an illustrative embodiment. The multi-optical fiber connector module 1 comprises a module housing 2 and a cover 3 and is shown in FIG. 1 connected to the ends of a plurality of optical fibers 4. FIG. 2 illustrates a top perspective view of the module housing 2 shown in FIG. 1 with the cover 3 and the optical fibers 4 removed. FIG. 3 illustrates a bottom perspective view of the module housing 2 shown in FIG. 2. FIG. 4 illustrates a cross-sectional side perspective view of the multi-optical fiber connector module 1 shown in FIG. 1. FIG. 5 illustrates an expanded view of the portion of the module 1 that is within the dashed circle 13 shown in FIG. 4. FIG. 6 illustrates an alternative embodiment of the module housing 2 shown in FIG. 2. FIG. 7 illustrates a cross-sectional view of the multi-optical fiber connector module 1 shown in FIG. 1 mated with a similarly-configured multi-optical fiber connector module 20. Characteristics and features of the multi-optical fiber connector module 1 will now be described with reference to FIGS. 1-7.

In accordance with this illustrative embodiment, there are a total of sixteen optical fibers 4 and the multi-fiber connector module 1 has sixteen respective optical pathways, although the invention is not limited with respect to the number of optical fibers that are connected to the connector module 1 or the number of optical channels that are provided in the connector module 1. The module housing 2 is typically a molded, unitary plastic part, although the invention is not limited with respect to the composition of the module housing 2. The cover 3 preferably is deformable to an extent and is typically made of unfilled plastic such as, for example, unfilled polyvinyl chloride (PVC), unfilled polycarbonate, unfilled cyclic olefin copolymer (COC), or unfilled nylon.

The multi-optical fiber connector module 1 has features that are similar or identical to features of a multi-optical fiber connector module that is disclosed in U.S. Pat. No. 7,543,994 (hereinafter the '994 patent) and U.S. Pat. No. 7,553,091 (hereinafter the '091 patent), which are assigned to the assignee of the present application and which are incorporated by reference herein in their entireties.

As can be seen in FIG. 2, an upper surface 2a of the module housing 2 has a cavity 5 formed therein. The cavity 5 functions as an optical fiber holding chamber for holding the ends of the optical fibers 4 (FIG. 1). The cavity 5 has length, L, and width, W, dimensions (FIG. 2) that are approximately equal to, but slightly greater than, the length and width dimensions of the cover 3 (FIG. 1) so that the cover 3 can be gently placed in the cavity 5 with minimal force and held in place in the cavity 5 until the cover 3 has been secured in position with an adhesive material 7 (FIG. 1). The cavity 5 has a lower surface 5a in which a plurality of grooves 6 (FIG. 2) are formed. Each groove 6 has a first portion 6a and a second portion 6b. The first portions 6a of the grooves 6 are generally semi-cylindrical in shape such that they are complementary in shape to the cylindrically-shaped outer surfaces of the jackets of the optical fibers 4. The second portions 6b of the grooves 6 are V-shaped.

Prior to securing the ends of the optical fibers 4 within the cavity 5, each optical fiber 4 is cleaved and then a portion of the jacket is removed, leaving a jacketed fiber portion 4a and an unjacketed fiber portion 4b, as can be seen in FIG. 4. The jacketed fiber portions 4a of the optical fibers 4 are positioned in the first portions 6a of the grooves 6 and the unjacketed fiber portions 4b are positioned in the second portions 6b of the grooves 6. When the cover 3 is placed in the cavity 5, crushable protrusions 3a disposed on the bottom of the cover 3 come into contact with the unjacketed fiber portions 4b of the optical fibers 4. The crushable protrusions 3a are slightly deformed by the forces exerted by the unjacketed fiber portions 4b on the protrusions 3a during placement of the cover 3 in the cavity 5. A soft sheet metal leaf spring (not shown) may be used during the placement process to apply an evenly-distributed force across the top surface of the cover 3 to cause the crushable protrusions 3a to be deformed. The deformed crushable protrusions 3a pin the unjacketed fiber portions 4b against the respective V-shaped second portions 6b of the grooves 6.

After the cover 3 has been placed and oriented in the cavity 5 of the module housing 2, as shown in FIGS. 1 and 4, the aforementioned adhesive material 7, is transparent to the primary wavelength of the optical signals being carried on the optical fibers 4, is dispensed into a gap 8 that exists between a forward end 3b of the cover 3 and a wall 5b that partially defines the cavity 5. The adhesive material 7 has an index of refraction that is equal to, or approximately equal to, the index of refraction of the cores (not shown) of the fibers 4. The adhesive material 7 fills any imperfections in the cleaved ends of the optical fibers 4, thereby making the joints transparent to the optical beams so that no internal reflection occurs at this boundary. When the adhesive material 7 is dispensed into the gap 8, it fills the gap 8 and flows between, and is in contact with, the bottom of the cover 3 and the unjacketed fiber portions 4b, as shown in FIG. 4. The adhesive material 7 is also in contact with the walls 5b, 5c and 5d (FIG. 2) that define the cavity 5. Thus, when the adhesive material 7 cures and becomes hardened, it fixedly secures the ends of the unjacketed fiber portions 4b within the respective V-shaped second portions 6b of the grooves 6 and fixedly secures the cover 3 to the lower surface 5a and to the walls 5b, 5c and 5d of the cavity 5.

As shown in FIG. 4, the ends of the unjacketed fiber portions 4b are adjacent to, or in contact with, the wall 5b of the module housing 2. Respective openings are formed in the module housing 2 that extend in the axial directions of the grooves 6 from the cavity 5 through the wall 5b and through a front surface 2b of the module housing 2. Within these openings, respective collimating lenses 9 are disposed in the front surface 2b of the module housing 2. First and second passive fine alignment features 10 extend from the front surface 2b of the module housing 2. The passive fine alignment features 10 are identical in structure to one another and have stepped cylindrical shapes made up of first and second cylindrical portions 10a and 10b, where the first cylindrical portion 10a has a diameter that is greater than a diameter of the second cylindrical portion 10b. The passive fine alignment features 10 are rounded where they transition from the second cylindrical portions 10b to their ends 10c. The passive fine alignment features 10 are designed to mate with respective openings formed in another module (not shown), as will be described below in more detail.

Providing the passive fine alignment features 10 with the stepped cylindrical shape shown in FIGS. 1-4 provides some advantages over long tapered pins, which have the potential to stick as they are being inserted into the respective reciprocally-shaped tapered openings formed in the mating module. This potential to stick is due to the nearly-continuous contact that occurs between the surfaces of the pins and the respective openings as they engage one another. If sticking occurs, it is possible that the respective passive fine alignment features will not fully engage one another, which can result in less than perfect misalignment.

One advantage of the stepped passive fine alignment features 10 is that there is less of a tendency to stick during insertion into the respective openings due to there being less surface-to-surface contact during insertion. This feature ensures that full mechanical coupling will occur, which ensures that precise optical alignment will be achieved. Another advantage is that the stepped cylindrical shapes are easier and less costly to manufacture than tapered shapes.

With reference again to FIG. 1, a back side 2c of the module housing 2 has tapered snap features 2d and 2e located on opposite sides thereof. As will be described below in more detail, these tapered snap features 2d and 2e contribute to the ability of the connector module 1 to float when it is held within a plug (not shown) or receptacle (not shown). The term "float," as that term is used herein, is intended to denote a limited amount of movement of an object in the X- and/or Y- and/or Z-directions of the X, Y, Z Cartesian coordinate system shown in FIG. 1 relative to another object that is positioned in the same reference frame, as will be described below in more detail. The module housing 2 has retention features 2f and 2g located on opposite sides thereof that retain the connector module 1 within a receptacle (not shown) such that movement of the module 1 in the forward Z-direction indicated by arrow 12 (FIG. 1) is prevented while allowing some movement in one or more other directions, as will be described below in more detail.

FIG. 5 illustrates an expanded view of the portion of the module 1 that is within the dashed circle 13 shown in FIG. 4. It can be seen in FIG. 5 that the wall 5b of the cavity 5 is curved, or tilted, relative to the X-Y plane. In contrast, the front surface 2b of the module housing 2 is in a plane that is parallel to the X-Y plane. Likewise, the cleaved end face 4c of the fiber 4 is generally parallel to the X-Y plane. Consequently, the end face 4c only abuts the wall 5b at the lower edge of the end face 4c, but is otherwise spaced apart from the wall 5b by a small gap. This small gap ensures that the adhesive material 7 covers all, or substantially all, of the end face 4c, thereby making the joint transparent to the optical beam. This feature prevents internal reflections from occurring at the interface between the end faces 4c and the lenses 9.

FIG. 6 illustrates an alternative embodiment of the module housing 2 for providing a small gap between the end faces 4c of the fibers 4 and the wall 5b of the cavity 5 to ensure that the adhesive material 7 (not shown) covers all, or substantially all, of the end face 4c. In accordance with this embodiment, stops 6c are formed at the ends of the grooves 6 where the grooves 6 meet the wall 5b. The stops 6c are very small in size relative to the diameter of the unjacketed fiber portions 4 so that only the lower edges of the end faces 4c abut the stops 6c. The stops 6c cause a gap to be created between the end faces 4c and the wall 5b that ensures that the adhesive material 7 covers all, or substantially all, of the end face 4c, thereby making the joint transparent to the optical beam to prevent internal reflections from occurring.

FIG. 7 illustrates a cross-sectional view of the multi-optical fiber connector module 1 shown in FIG. 1 mated with a similarly-configured multi-optical fiber connector module 20. The manner in which the passive fine alignment features 10 disposed on the connector module 1 mate with respective complementary-shaped openings 21 formed in the module 20 can be seen in FIG. 7. The complementary-shaped openings 21 correspond to the passive fine alignment features of module 20. It can be seen that when the modules 1 and 20 are in the fully-mated configuration shown in FIG. 7, the front surface 2b of the module 1 is in abutment with a front surface 22 of the module 20 and the optical pathways of the modules 1 and 20 are in precise optical alignment with one another. The module 20 has lenses (not shown) that are identical to the lenses 9 of module 1 and that are in optical alignment with the lenses 9 when the modules 1 and 20 are in the fully-mated configuration shown in FIG. 7. The mating of the passive fine alignment features 10 and 21 effectuates the aforementioned fine alignment process, but the aforementioned coarse alignment process is effectuated by engagement of respective passive coarse alignment features (not shown) that are disposed on devices or structures that hold arrays, or banks, of the modules 1 and 20, as will be described below in detail.

FIGS. 8A and 8B illustrate front and back perspective views, respectively, of a multi-optical fiber connector module 30 that is identical in structure to the connector module 100 disclosed in the '091 patent. Therefore, a detailed description of the connector module 30 will not be provided herein. Like the connector module 1 shown in FIG. 1, the connector module 30 includes a cover (not shown) that is identical to cover 3 (FIG. 1) that is secured to the module housing 31 to hold the ends of the optical fibers (not shown) in place. In FIGS. 8A and 8B, the cover is not shown for ease of illustration.

The connector module 30 shown in FIGS. 8A and 8B has some features or elements that are identical to features of the connector module 1 shown in FIGS. 1-7. The connector module 30 has tapered snap features 31a and 31b that perform the same functions as the snap features 2d and 2e of module 1, i.e., allowing the module 30 to float to some extent. The connector module 30 has retention features 31c and 31d that perform the same functions as the retention features 2f and 2g of module 1, i.e., retaining the connector module 30 within a receptacle (not shown) such that movement of the module 30 in the forward Z-direction (arrow 32 in FIG. 8A) is prevented while allowing some movement in one or more other directions, as will be described below in more detail. The connector module 30 has tapered passive fine alignment features 33 that are different from the stepped passive fine alignment features 10 of the connector module 1, but perform the same fine alignment process described above with reference to passive fine alignment features 10.

Figure 10B:
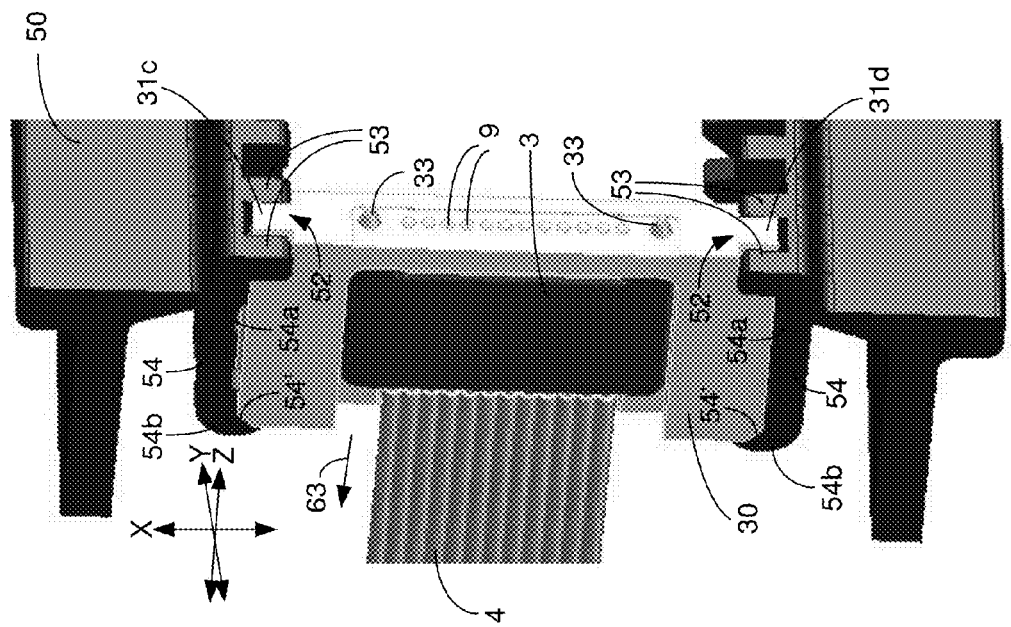
FIGS. 10A and 10B illustrate top and front perspective views, respectively, of a portion of the plug shown in FIGS. 9A and 9B with only a single connector module inserted therein.
Figure 10A:
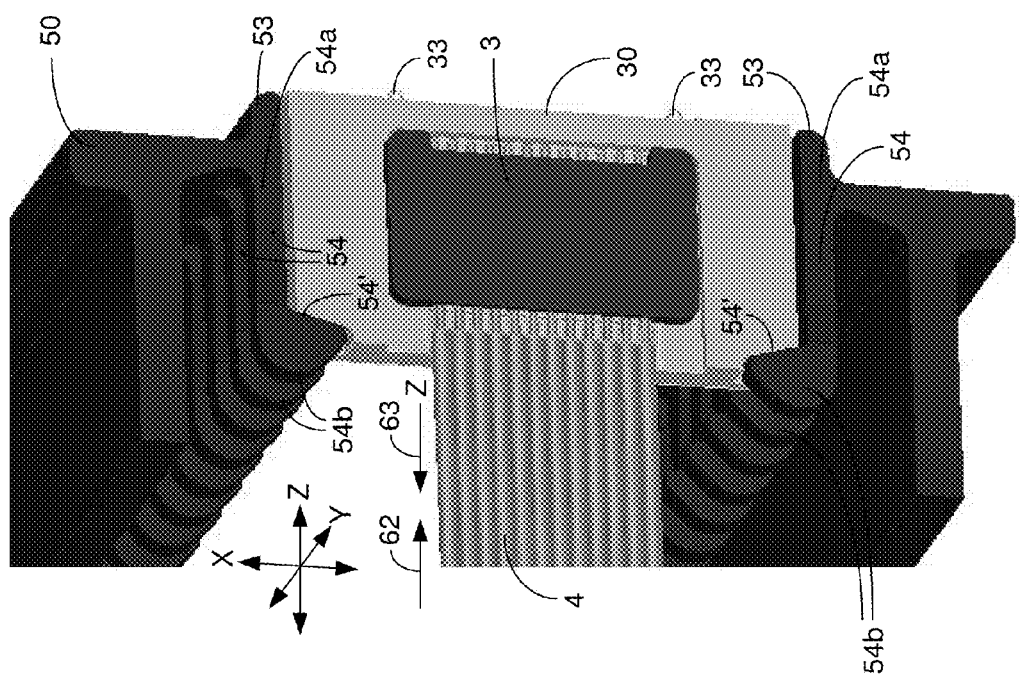

FIGS. 9A and 9B illustrate back and front perspective views, respectively, of a plug 50 that holds a bank, or array, of the connector modules 30 shown in FIGS. 8A and 8B. FIGS. 10A and 10B illustrate top and front perspective views, respectively, of a portion of the plug 50 shown in FIGS. 9A and 9B with only a single connector module 30 inserted therein to better demonstrate the manner in which features of the plug 50 and features of the module 30 enable the module 30 to float to a limited extent within the plug 50. Within a plug housing 51 of the plug 50, slots 52 (FIG. 10B) exist that are defined by stops 53 and spring arms 54. The stops 53 prevent movement of the modules 30 in the forward Z-direction indicated by arrow 62 (FIG. 10A). Each spring arm 54 has a proximal end 54a that joins a respective one of the stops 53 and a distal end 54b that extends in the rearward Z-direction away from the respective stop 53 (FIGS. 10A and 10B). The distal ends 54b have inner surfaces 54b' (FIGS. 10A and 10B) that are complementary in shape to the tapered snap features 31a and 31b (FIGS. 8A and 8B) formed on the module housing 31.

The modules 30 are snapped into their respective slots 52 by inserting the modules 30 into the slots in the forward Z-direction indicated by arrow 62 (FIG. 10A). When the modules 30 are snapped into their respective slots 52 in the plug housing 51, the modules 30 are held firmly in the slots 52 by the engagement of the stops 53 with the retention features 31c and 31d (FIG. 10B) and the engagement of the distal ends 54b of the spring arms 54 with the tapered snap features 31a and 31b. The plug housing 51 is typically made as a unitary part of a flexible molded plastic material that gives the spring arms 54 a degree of elasticity that allows the modules 30 to float to a limited extent in the X- and Y-directions and in the rearward Z-direction indicated by arrow 63 (FIGS. 10A and 10B). The tapered shapes of the tapered snap features 31a and 31b and of the inner surfaces 54b' of the distal ends 54b of the spring arms 54 allow relative movement between these surfaces to occur, which allows the connector modules 30 to float into their fine alignment positions as they are mated with respective connector modules (not shown) disposed in a receptacle (not shown).

Figure 11:
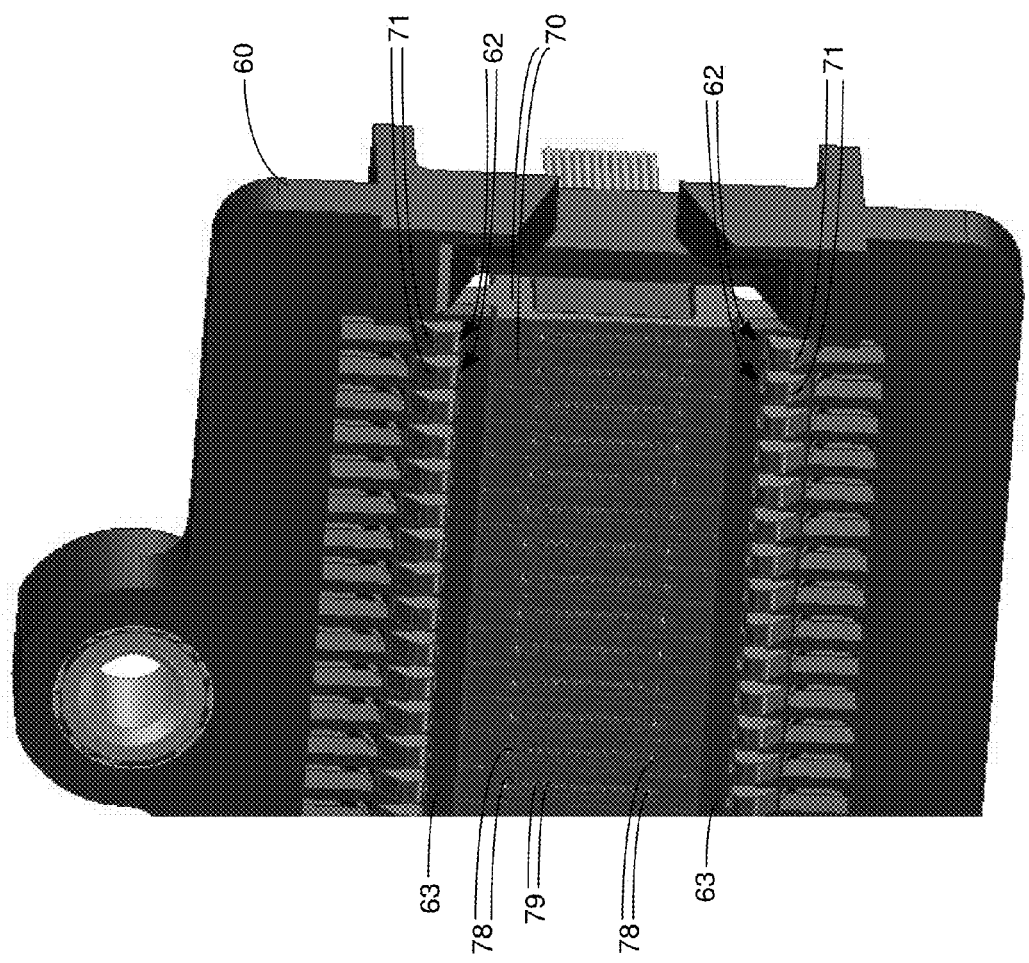
FIG. 11 illustrates a front perspective view of a portion of a receptacle that holds a bank, or array, of multi-optical fiber connector modules that are configured to mate with the multi-optical fiber connector modules held in the plug 50 shown in FIGS. 9A-10B.
Figure 12:
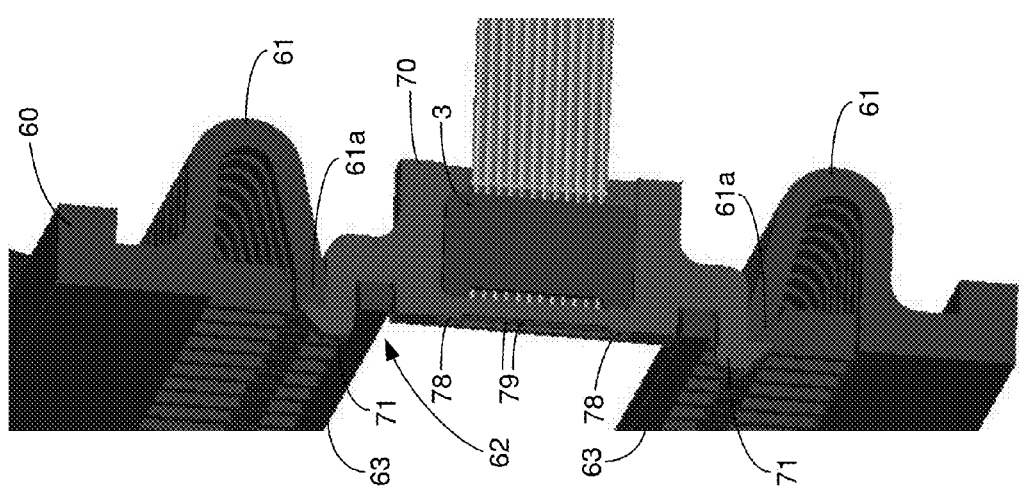
FIG. 12 illustrates a side perspective view of a portion of the receptacle shown in FIG. 11 having a single connector module disposed therein.
Figure 13:
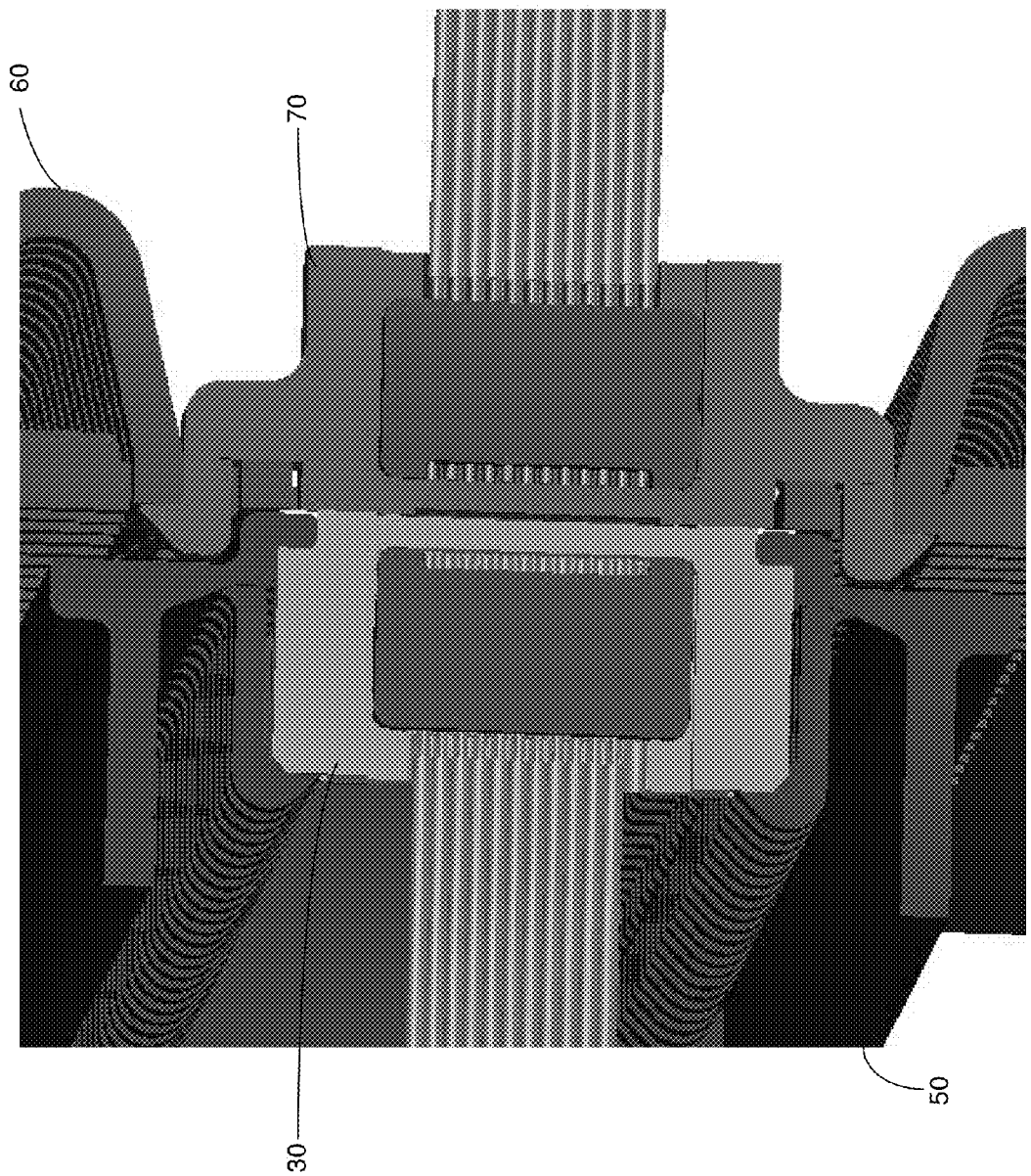
FIG. 13 illustrates a side perspective view of the plug shown in FIGS. 10A and 10B engaged with the receptacle shown in FIG. 12 such that the connector module held in the plug is fully mated with the connector module held in the receptacle.

FIG. 11 illustrates a front perspective view of a portion of a receptacle 60 that holds a bank, or array, of multi-optical fiber connector modules 70 that are configured to mate with the multi-optical fiber connector modules 30 held in the plug 50 shown in FIGS. 9A-10B. FIG. 12 illustrates a side perspective view of a portion of the receptacle 60 shown in FIG. 11 having a single connector module 70 disposed therein. FIG. 13 illustrates a side perspective view of the plug 50 shown in FIGS. 10A and 10B engaged with the receptacle 60 shown in FIG. 12 such that the connector module 30 held in the plug 50 is fully mated with the connector module 70 held in the receptacle 60.

The receptacle 60 is typically a unitary part made of a molded plastic material, which may be the same material that is used to make the plug 50. The receptacle 60 has springs 61 (FIG. 12) formed therein that provide the receptacle 60 with a degree of elasticity that enables the connector modules 70 to be snapped into slots formed in the receptacle 60. Snap features 71 (FIGS. 11 and 12) on the modules 70 engage respective openings 62 (FIGS. 11 and 12) in the receptacle 60 that are defined by a cross bar 63 of the receptacle 60 and distal ends 61a (FIG. 12) of the springs 61. The receptacle 60 is configured to be stiffer than the plug 50 to prevent the modules 70 from floating within the receptacle 60. Thus, the modules 30 held within the plug 50 are allowed to float whereas the modules 70 held within the receptacle 60 are not allowed to float. This feature helps ensure that the modules 30 will fully mate with the respective modules 70 when the plug 50 is plugged into the receptacle 60. If both banks of modules 30 and 70 were allowed to float, there would be a possibility that the passive fine alignment features of at least some of the modules 30 and 70 would not correctly mate.

The connector modules 70 are very similar to the connector modules 30. One key difference is that the connector modules 70 have passive fine alignment features 78 (FIGS. 11 and 12) that are complementary in shape to the shape of the tapered passive fine alignment features 33 of the connector modules 30 (FIGS. 8A and 8B). The connector module 70 also has lenses 79 (FIGS. 11 and 12) that are aligned with the lenses 9 of the module 30 when the modules 30 and 70 are fully engaged with one another.

Figure 14:
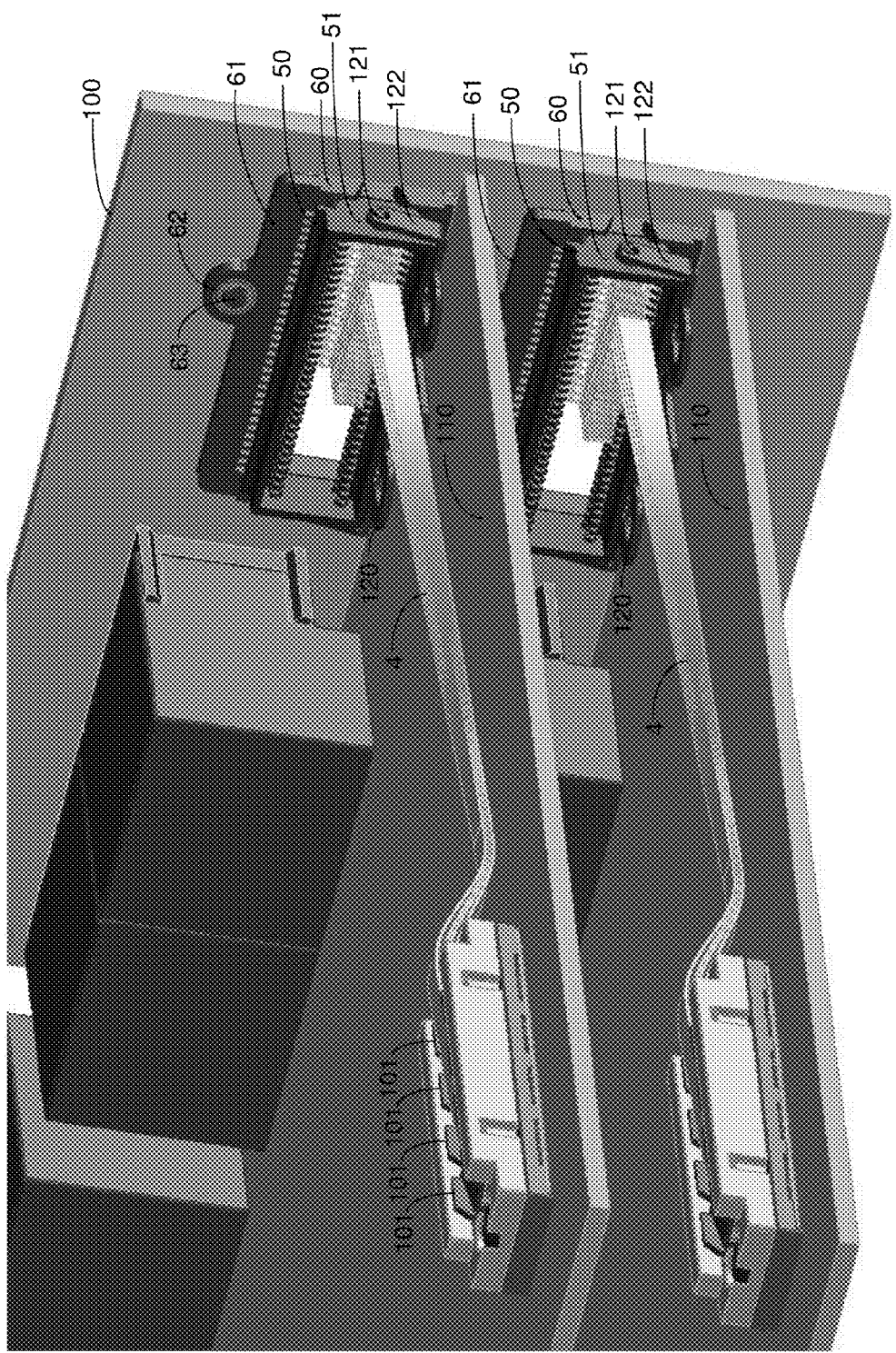
FIG. 14 illustrates a perspective view of a backplane PCB having the receptacle shown in FIG. 11 mounted thereon and a server PCB having the plug shown in FIGS. 9A and 9B mounted thereon such that connector modules that are held within the plug are mated with respective connector modules held within the receptacle.

FIG. 14 illustrates a perspective view of a backplane PCB 100 having the receptacle 60 shown in FIG. 11 mounted thereon and a server PCB 110 having the plug 50 shown in FIGS. 9A and 9B mounted thereon such that the connector modules 30 (FIG. 13) that are held within the plug 50 are mated with the respective connector modules 70 (FIG. 13) held within the receptacle 60. FIG. 14 represents an illustrative embodiment in which a server box (not shown) containing server PCB 110 on which the plug 50 is mounted is inserted into a rack (not shown) that contains the backplane PCB 100 on which the receptacle 60 is mounted. In this case, the PCB 100 of the rack is the aforementioned "first structure" and the PCB 110 of the server box is the aforementioned "second structure." The server box and the rack are not shown in FIG. 14 in order to allow the plug 50, the receptacle 60 and the PCBs 100 and 110 to be clearly seen.

As shown in FIG. 14, the plug 50 is mounted on a plug base 120, which, in turn, is mounted on the server PCB 110. The receptacle 60 includes a flange 61 having openings 62 formed therein for receiving pins 63. The pins 63 have proximal ends that are disposed within the openings 62 and distal ends that extend through the openings 62 and pass into the backplane PCB 100 to thereby fixedly secure the receptacle 60 to the backplane PCB 100. In accordance with this illustrative embodiment, the optical fibers 4 that are connected on their ends to the connector modules 30 are connected on their opposite ends to respective parallel optical communications modules 101, which may be parallel optical transmitter modules, parallel optical receiver modules, or parallel optical transceiver modules.

Figure 15:
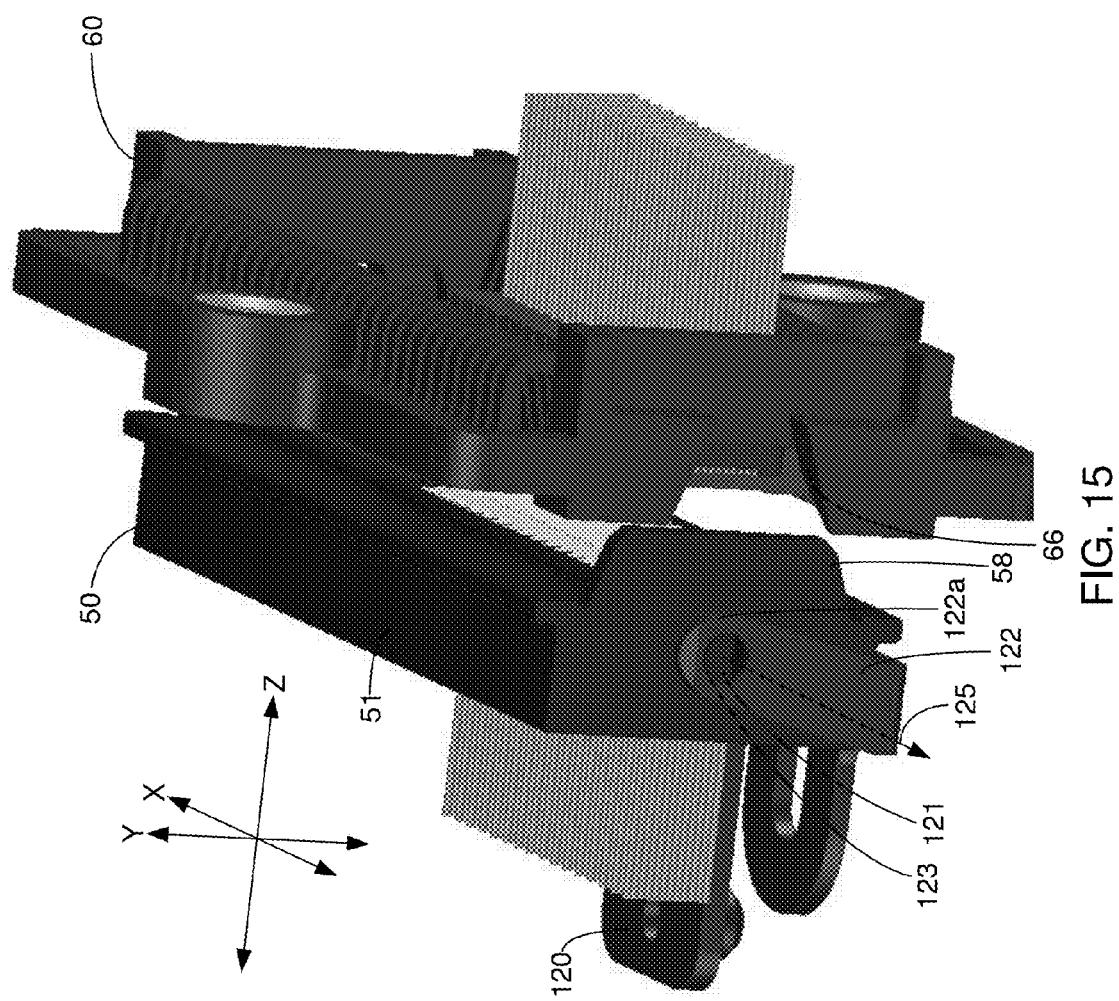
FIG. 15 illustrates a perspective view of the plug and the receptacle shown in FIG. 14 with the PCBs removed to better demonstrate the manner in which the plug and the receptacle engage one another.

FIG. 15 illustrates a perspective view of the plug 50 and the receptacle 60 shown in FIG. 14 with the PCBs 100 and 110 removed to better illustrate the manner in which the plug 50 and the receptacle 60 engage one another. The plug 50 is pivotally mounted on the plug base 120 by pins 121 that pass through openings 123 formed in distal ends 122a of spring arms 122 of the plug base 120 and engage openings (not shown) formed in opposite sides of the plug housing 51. This pivotal mounting allows the plug 50 to move through a limited angular range about an imaginary axis 125 that passes through the centers of the pins 121 and that is parallel to the X-axis. Providing the plug 50 with the ability to rotate enables the plug 50 to float into alignment with the receptacle 60 as the plug 50 and the receptacle 60 engage one another.

FIGS. 16A and 16B illustrate bottom and top perspective views, respectively, of the plug base 120 shown in FIG. 15. In accordance with this illustrative embodiment, the plug base 120 has alignment pins 126 located on its mounting portion 131 that engage respective openings (not shown) formed in the server PCB 110 to align the plug base 120 on the PCB 110. An adhesive material (not shown) such as epoxy or glue may be placed on the bottom surface of the mounting portion 131 of the plug base 120 to fixedly secure the plug base 120 to the server PCB 110 (FIG. 14). Spring arms 122 of the plug base 120 are configured to have a preselected amount of flexibility such that the distal ends 122a of the spring arms 122 are allowed to flex to a limited degree in the X-, Y- and Z-directions indicated by arrows 141, 142 and 143 (FIG. 16B), respectively. The spring arms 122 have proximal ends 122b that are joined to opposite sides of the mounting portion 131 of the plug base 120. The flexibility of the spring arms 122 combined with the ability of the plug 50 to rotate allows the plug 50 to float into alignment with the receptacle 60 as the plug 50 and the receptacle 60 engage one another.

With reference again to FIG. 15, the plug housing 51 has passive coarse alignment features 58 on it that extend in the forward Z-direction from opposite sides of the plug housing 51. In accordance with this illustrative embodiment, the passive coarse alignment features 58 are tapered projections, but other types of passive coarse alignment features may be used, as will be understood by persons skilled in the art in view of the description being provided herein. The receptacle 60 has passive coarse alignment features 66 (FIG. 15) disposed on opposite sides thereof. In accordance with this illustrative embodiment, the passive coarse alignment features 66 are tapered indentations, but other types of passive coarse alignment features may be used on the receptacle 60, as will be understood by persons skilled in the art in view of the description being provided herein.

The tapered indentations 66 are complementary in shape to the shape of the tapered projections 58 to allow them to mate to effectuate coarse alignment of the plug 50 and the receptacle 60 as they are brought into engagement with one another. The structure (not shown) on which the plug 50 is mounted (e.g., a PCB of a server box) and the structure (not shown) on which the receptacle 60 is mounted (e.g., a PCB of a rack) will typically have passive coarse alignment features on them that bring these structures into coarse alignment with one another as they engage one another. Such passive coarse alignment features may be, for example, sever boxes that are shaped and sized to be received in suitably shaped and sized slots of a rack. When the structures are brought into engagement with one another, the tapered projections 58 and the tapered indentations 66 engage one another to bring the plug 50 and the receptacle 60 into coarse alignment with one another. The floating nature of the plug 50 facilitates alignment and mating of the projections 58 and the indentations 66 in that it allows the plug 50 to float relative to the structure on which it is mounted to the position of the receptacle 60.

As the plug 50 and the receptacle 60 engage one another, the passive fine alignment features 33 of the modules 30 engage the respective passive fine alignment features 78 of the modules 70. The ability of the modules 30 to float relative to the plug housing 51 ensures that the passive fine alignment features 33 will fully engage the respective passive fine alignment devices 78, thereby bringing the modules 30 and 70 into fine, or precise, mechanical and optical alignment with one another.

The combination of all of these floating features allows the modules 30 and 70 to be blind mated by simply engaging the structures on which the plug 50 and receptacle 60 are mounted with one another. This feature, in turn, obviates the need to use optical cables to optically interconnect any of the modules. For example, when the plug 50 and the receptacle 60 are mounted on a server box and a rack, respectively, the blind mating of the modules 30 and 70 occurs when the server box is shoved into a slot or onto a shelf of the rack. The full insertion of the servicer box into the rack interconnects respective banks of the modules 30 and 70 to effectuate blind mating of the modules 30 and 70. This great simplifies the optical coupling tasks and makes the tasks easier and capable of being performed in a much shorter period of time.

It should be noted that the invention has been described with reference to illustrative, or exemplary, embodiments in order to demonstrate the principles and concepts of the invention. As will be understood by those of skill in the art, the invention is not limited to the illustrative embodiments described herein. For example, the features that allow the floating aspects to be achieved are not limited to the features that have been described herein. Persons skilled in the art will understand, in view of the description provided herein, that a variety of mechanism can be used to achieve the floating aspects described herein. Also, while the modules 30 and the plug 50 have been described as being configured to float, it may be sufficient for one or the other of these components, but not both, to float. It should also be noted that the modules 30 and the plug 50 may be configured such that they do not float and the modules 70 and/or the receptacle 60 may be configured to float to enable the coarse and fine alignment processes to be performed. Persons skilled in the art will understand the manner in which these and other modifications may be made to the embodiments described herein and that all such modifications are within the scope of the invention.

What is claimed is:

1. A system for blind mating multi-optical fiber connector modules, the system comprising:
    a first structure;
    a plug mounted on the first structure, the plug including a plug housing having first passive coarse alignment features thereon;
    a plurality of first multi-optical fiber connector modules held in slots formed in the plug housing, each of the first multi-optical fiber connector module having first fine passive alignment features thereon, each of the first multi-optical fiber connector modules being configured to mechanically and optically couple to ends of a plurality of first optical fibers;
    a second structure;
    a receptacle mounted on the second structure, the receptacle having second passive coarse alignment features thereon; and
    a plurality of second multi-optical fiber connector modules held in slots formed in the receptacle, each of the second multi-optical fiber connector modules having second fine passive alignment features thereon, each of the second multi-optical fiber connector modules being configured to mechanically and optically couple to ends of a plurality of second optical fibers, and wherein the first and second structures are mechanically engaged with one another such that the first passive coarse alignment features of the plug are engaged with the second passive coarse alignment features of the receptacle, and wherein the engagement of the first and second passive coarse alignment features causes the first passive fine alignment features of the first multi-optical fiber connector modules to engage the second passive fine alignment features of respective second multi-optical fiber connector modules such that each of the first multi-optical fiber connector modules is engaged with, and optically aligned with, a respective second multi-optical fiber connector module.

2. The system of claim 1, wherein either the first multi-optical fiber connector modules float to a limited extent with reference to the plug or the second multi-optical fiber connector modules float to a limited extent with reference to the receptacle.

3. The system of claim 2, wherein the first multi-optical fiber connector modules float to a limited extent with reference to the plug.

4. The system of claim 2, wherein the second multi-optical fiber connector modules float to a limited extent with reference to the receptacle.

5. The system of claim 1, wherein either the plug floats to a limited extent with reference to the first structure or the receptacle floats to a limited extent with reference to the second structure.

6. The system of claim 5, wherein the plug floats to a limited extent with reference to the first structure.

7. The system of claim 5, wherein the receptacle floats to a limited extent with reference to the second structure.

8. The system of claim 2, wherein either the plug floats to a limited extent with reference to the first structure or the receptacle floats to a limited extent with reference to the second structure.

9. The system of claim 8, wherein the plug floats to a limited extent with reference to the first structure.

10. The system of claim 8, wherein the receptacle floats to a limited extent with reference to the second structure.

11. The system of claim 1, wherein the first multi-optical fiber connector modules float to a limited extent with reference to the plug, and wherein the plug floats to a limited extent with reference to the first structure.

12. The system of claim 1, wherein the second multi-optical fiber connector modules float to a limited extent with reference to the receptacle, and wherein the receptacle floats to a limited extent with reference to the second structure.

13. The system of claim 11, wherein the first structure is a printed circuit board (PCB) of a server box and wherein the second structure is a PCB of a rack that is configured to receive the server box such that the first passive coarse alignment features of the plug engage the second passive coarse alignment features of the receptacle.

14. A method for blindly mating a plurality of first multi-optical fiber connector modules with a plurality of second multi-optical fiber connector modules, the method comprising:

providing a first structure having a plug mounted thereon, the plug including a plug housing having first passive coarse alignment features thereon, wherein a plurality of first multi-optical fiber connector modules are held in slots formed in the plug housing, each of the first multi-optical fiber connector modules having first fine passive alignment features thereon, each of the first multi-optical fiber connector modules being mechanically and optically coupled to ends of a plurality of first optical fibers;

providing a second structure having a receptacle mounted thereon, the receptacle having second passive coarse alignment features thereon, wherein a plurality of second multi-optical fiber connector modules are held in slots formed in the receptacle, each of the second multi-optical fiber connector module having second fine passive alignment features thereon, each of the second multi-optical fiber connector modules being mechanically and optically coupled to ends of a plurality of second optical fibers; and mechanically engaging the first and second structures with one another such that the first passive coarse alignment features of the plug are engaged with the second passive coarse alignment features of the receptacle, wherein the engagement of the first passive coarse alignment features with the second passive coarse alignment features causes the first and second passive fine alignment features of the first and second multi-optical fiber connector modules to engage one another such that each of the first multi-optical fiber connector modules is engaged with, and optically aligned with, a respective second multi-optical fiber connector module.

15. The method of claim 14, wherein either the first multi-optical fiber connector modules float to a limited extent with reference to the plug or the second multi-optical fiber connector modules float to a limited extent with reference to the receptacle.

16. The method of claim 15, wherein the first multi-optical fiber connector modules float to a limited extent with reference to the plug.

17. The method of claim 15, wherein the second multi-optical fiber connector modules float to a limited extent with reference to the receptacle.

18. The method of claim 14, wherein either the plug floats to a limited extent with reference to the first structure or the receptacle floats to a limited extent with reference to the second structure.

19. The method of claim 18, wherein the plug floats to a limited extent with reference to the first structure.

20. The method of claim 18, wherein the receptacle floats to a limited extent with reference to the second structure.

21. The method of claim 15, wherein either the plug floats to a limited extent with reference to the first structure or the receptacle floats to a limited extent with reference to the second structure.

22. The method of claim 21, wherein the plug floats to a limited extent with reference to the first structure.

23. The method of claim 21, wherein the receptacle floats to a limited extent with reference to the second structure.

24. The method of claim 14, wherein the first multi-optical fiber connector modules float to a limited extent with reference to the plug, and wherein the plug floats to a limited extent with reference to the first structure.

25. The method of claim 14, wherein the second multi-optical fiber connector modules float to a limited extent with reference to the receptacle, and wherein the receptacle floats to a limited extent with reference to the second structure.

26. The method of claim 24, wherein the first structure is a printed circuit board (PCB) of a server box and wherein the second structure is a PCB of a rack that is configured to receive the server box such that the first passive coarse alignment features of the plug engage the second passive coarse alignment features of the receptacle.

\* \* \* \* \*